United States Patent [19]

Chang et al.

[11] 4,218,355

[45] Aug. 19, 1980

[54] LOW ORGANIC SOLVENT-CONTAINING POLYESTER COATING COMPOSITIONS

[75] Inventors: Wen-Hsuan Chang, Gibsonia; John R. Peffer, Pittsburgh; Ronald J. Lewarchik, Natrona Heights, all of Pa.

[73] Assignee: PPG Industries, Inc., Pittsburgh, Pa.

[21] Appl. No.: 926,690

[22] Filed: Jul. 21, 1978

[51] Int. Cl.$^2$ .............................................. C08L 61/28
[52] U.S. Cl. ............................... 260/29.4 R; 260/31.6
[58] Field of Search .................. 260/29.4 R, 31.6, 850

[56] References Cited

U.S. PATENT DOCUMENTS

| | | | |
|---|---|---|---|
| 3,883,454 | 5/1975 | Dhein | 260/22 R |
| 3,959,201 | 5/1976 | Chang | 260/29.4 R |
| 3,994,851 | 11/1976 | Chang | 260/29.4 R |

*Primary Examiner*—Paul R. Michl

*Attorney, Agent, or Firm*—Charles R. Wilson

[57] ABSTRACT

Low organic solvent-containing coating compositions are prepared by blending (i) an ester-containing polyol, having a number average molecular weight of from about 140 to about 700, a hydroxyl value of from about 160 to about 1100 and a viscosity of less than about 1200 poises, which is derived from an aromatic or alicyclic monobasic acid and, optionally, a minor proportion of a polybasic acid and a polyol having an average hydroxyl functionality of from about 2.1 to about 5.0 with (ii) an aminealdehyde crosslinking agent. Particularly valuable coating compositions which can be cured at relatively low temperatures are obtained by incorporating a cure accelerating catalyst into the composition. The compositions aid in environmental pollution control and form films having good adhesion, flexibility, hardness, stain resistance, detergent resistance, solvent resistance and durability.

13 Claims, No Drawings

LOW ORGANIC SOLVENT-CONTAINING POLYESTER COATING COMPOSITIONS

BACKGROUND OF THE INVENTION

The present invention relates to coating compositions. More particularly, the invention relates to coating compositions containing less than about 30 percent organic solvents and which are based on an ester-containing polyol and an amine-aldehyde resin.

In recent years the coatings industry has become increasingly interested in low organic solvent-containing coating compositions; that is, coating compositions which can be applied by conventional techniques such as spraying, dipping, roll coating, etc., without the use of a high content of volatile solvents. The use of such compositions presents several advantages, including high film build per application, economy of materials since normally the solvents are lost to the ambient surroundings, the alleviation of environmental control problems such as treatment of plant effluents to capture or destroy volatile solvents, and energy savings since less air needs to be heated to volatilize the solvents in the curing oven.

However, to be a viable coating material, the low organic solvent-containing coating composition must be capable of forming a film having at least several of those characteristics required of coatings, e.g., adhesion, flexibility, hardness, stain resistance, detergent resistance, solvent resistance, humidity resistance and durability.

Various prior art references do disclose coating compositions having reasonably high solids contents (and thus low organic solvent contents). For example, U.S. Pat. No. 3,553,284 to Riemhofer et al., issued Jan. 5, 1971, is directed to compositions comprising an aminoplast and a polyester of hexahydroterephthalic acid and a diol having adjacent hydroxy groups, e.g., ethylene glycol, butanediol-(2,3), or cyclohexanediol-(1,2). U.S. Pat. No. 3,852,375 to Biethan et al., issued Dec. 3, 1974, discloses an ester of (1) aliphatic polyol and aliphatic diols such as ethylene glycol and propane diol and (2) one or more aromatic or cycloaliphatic dicarboxylic acids and one or more saturated aliphatic dicarboxylic acids together with an aminoplast resin. U.S. Pat. No. 3,883,454 to Dhein et al, issued May 13, 1975, discloses a high solids coating composition comprising a blend of a melamine resin and a binder of an oligomeric alkyd resin of a polyalcohol and an aromatic dicarboxylic acid. As further disclosed in the aforementioned patent, the oligomeric alkyd resin has a hydroxyl number between 40 and 150 and a molecular weight of from 800 to 2000. The aforedescribed compositions are not fully satisfactory due to their high viscosities, low water-compatibility and/or unsatisfactory film characteristics.

U.S. Pat. Nos. 3,959,201 and 3,994,851 to Chang, issued May 25, 1976 and Nov. 30, 1976, respectively, also describe high solids containing coating compositions. U.S. Pat. No. 3,959,201 describes coating compositions based on hydroxyl-containing organic materials and aminoplast resins. Several hydroxyl-containing materials are described, including polyester polyol oligomers based on triol or higher alcohol and a monocarboxylic acid such as acetic acid. U.S. Pat. No. 3,994,851 describes coating compositions of ester-containing polyols and amine-aldehyde crosslinking agents. The ester-containing polyol is described as prepared from a polyol and a polycarboxylic acid. While such disclosed compositions are satisfactory, there is still a need for low organic solvent- and high solids-containing coating compositions possessing better and/or different desirable characteristics.

There has now been found coating compositions which have low organic solvent contents, yet which have low viscosities (and, therefore, are easy to blend, mix and apply) and generally possess good water-compatibility. Films formed from the compositions possess a desirable set of characteristics.

As used herein, all percents, parts and ratios are by weight unless otherwise stated.

SUMMARY OF THE INVENTION

Coating compositions having an organic solvent content of less than about 30 percent consist essentially of: (a) an at least 40 percent resin solids content of (i) from about 15 parts to about 90 parts of an ester-containing polyol having a number average molecular weight of from about 140 to about 700, a hydroxyl value of from about 160 to about 1100 and a viscosity of less than about 1200 poises, said ester-containing polyol being the esterification product of: an acid reactant comprising (1) from about 55 molar percent to about 100 molar percent of an aromatic or alicyclic monobasic acid, and (2) from about 0 molar percent to about 45 molar percent of a polybasic acid, and an alcohol reactant comprising a polyol having a hydroxyl functionality of from about 2.1 to about 5.0 wherein the equivalent ratio of the acid reactant to the alcohol reactant is from about 1:19 to about 1:1.2; and (ii) from about 10 parts to about 85 parts of an amine-aldehyde resin; and (b) the balance, if any, being water.

DETAILED DESCRIPTION OF THE INVENTION

This invention relates to low organic solvent-containing coating compositions which are prepared by blending an ester-containing polyol with an amine-aldehyde crosslinking agent. The organic solvent contents of the compositions are less than about 30 percent, preferably less than about 20 percent, of the total composition. Such coating compositions have a resin solids content of at least about 40 percent, preferably at least about 70 percent, of the ester-containing polyol and amine-aldehyde resins. Compositions of 100 percent solids are possible. Each of the components of the coating compositions is described in the following paragraphs.

The ester-containing polyol is made from an aromatic or alicyclic monobasic acid and a polyol. The ester-containing polyester has a number average molecular weight of from about 140 to about 700, a hydroxyl value of from about 160 to about 1100 and a viscosity of less than about 1200 poises. Preferred ester-containing polyols have a number average molecular weight of from about 160 to about 500, a hydroxyl value of from about 180 to about 800 and a viscosity of less than about 600 poises. As used herein, the viscosity is determined by heating the ester-containing polyol to a temperature sufficient to melt or liquify it, cooling it down to room temperature and then determining its viscosity before it crystallizes. Determining a material's viscosity at liquid state at room temperature is a well-known procedure and is considered to be a reliable and reproducible viscosity measurement.

The acid reactant utilized in forming the ester-containing polyol can consist solely of an aromatic or alicyclic monobasic acid. Suitable monobasic acids which are employed are benzoic acid, para-tertiary butyl benzoic acid, cyclohexane carboxylic acid, cyclopentane carboxylic acid, 1,2,3,4-tetrahydronapthoic acid, dl-3-camphor carboxylic acid and abietic acid. A preferred monobasic acid is benzoic acid.

In addition to the monobasic acid component, the acid reactant utilized in forming the ester-containing polyol can optionally include a minor proportion of a polybasic acid. Thus, from about 0 molar percent to about 45 molar percent of the polybasic acids are utilized to impart desirable properties such as flexibility, hardness, etc., to the ester. A preferred acid reactant comprises a mixture of from about 65 molar percent to about 100 molar percent of the monobasic acid and from about 0 molar percent to about 35 molar percent of the polybasic acid. Suitable polybasic acids which are employed for these purposes include aromatic, alicyclic and aliphatic dicarboxylic acids and their anhydrides where they exist.

Suitable aromatic and alicyclic dicarboxylic acids which are employed include phthalic acid, isophthalic acid, hexahydrophthalic acid, tetrahydrophthalic acid, hexahydroterephthalic acid, hexahydroisophthalic acid, as well as endomethylene—and endoethylene tetrahydrophthalic acid, hexachloroendomethylene tetrahydrophthalic acid and tetrabromophthalic acid.

Especially suitable aliphatic dicarboxylic acids which are employed include saturated aliphatic dicarboxylic acids having from 4 to 12 carbon atoms such as succinic acid, glutaric acid, adipic acid, suberic acid, sebacic acid, azelaic acid, dodecane-dicarboxylic acid and 2,2,4- and 2,4,4-trimethylhexadioic acid. Preferred saturated aliphatic dicarboxylic acids are adipic acid and azelaic acid. Unsaturated aliphatic dicarboxylic acids such as for example, maleic acid, fumaric acid, itaconic acid and citraconic acid can also be used; however, the use of saturated aliphatic dicarboxylic acids is preferred.

The alcohol reactant comprises a polyol having an average hydroxyl functionality of from about 2.1 to about 5.0, preferably from about 2.5 to about 4.0. (The term "hydroxyl functionality" as employed herein in reference to the polyol refers to the average number of hydroxyl groups per molecule.)

Particularly useful polyols which are employed are triols such as trimethylolpropane; trimethylolethane; 1,2,3-propanetriol; 1,2,4-butanetriol; and 1,2,6-hexanetriol. In addition, polycaprolactone polyols, such as triols, are advantageously employed. The polycaprolactone triols are reaction products of trimethylolpropane and epsilon-caprolactone in selected molar ratios and are commercially available under the designation NIAX Polyol PCP 0301 and 0310. Trimethylolpropane is a preferred triol. Oxyalkylation products of polyols are also very useful. Examples are 1,1,1-tris(2-hydroxyethoxymethyl)propane and 1,1,1-tris(2-hydroxyl-2-methylethoxymethyl)propane. Polyols having hydroxyl functionality of greater than 3 which may be employed include, for example, pentaerythtritol, diglycerol, dipentaerythritol, butanetetrol, hexanehexitol, sorbitol and mannitol. Of these, pentaerythritol is preferred.

The polyol component can be a mixture of polyols having an average hydroxyl functionality of from about 2.1 to about 5. It can be obtained by blending a diol with a polyol having a hydroxyl functionality of 3 or greater. Diols which are utilized for that purpose include glycols of the formula $HO(CH_2)_nOH$ wherein n equals 2 to 10, glycols of the formulas $HO(CH_2CH_2O)_nH$ and $HO[CH(R)CH_2O]_nH$ in which n equals 1 to 10 and R is the residue segment of a monoepoxide. Specific examples of diols include ethylene glycol, diethylene glycol, an ethylene glycol reaction product with propylene oxide, and an ethylene glycol reaction product with a glycidyl ether, dipropylene glycol, 2,2-dimethyl-1,3-propanediol, 2,2-diethyl-1,3-propanediol, 2,2,4-trimethyl-1,3-pentanediol, 3-methyl-1,5-pentanediol, and N-methyl and N-ethyl diethanolamines. Others include 4,4'-methylenebis (cyclohexanol), 4,4'-isopropylidenebis (cyclohexanol) and various xylenediols, hydroxymethylphenylethyl alcohols, hydroxymethylphenylpropanols, phenylenediethanols, phenylenebis (oxyethanols), phenylenedipropanols and heterocyclic diols such as 1,4-piperazinediethanol. Still other satisfactory diols include 2-methyl-2-ethyl-1,3-propanediol, 2-ethyl-1,3-hexanediol, and 2,2-dimethyl-3-hydroxypropyl-2',2'-dimethyl-3'-hydroxypropionate.

Preparation of the ester-containing polyol is accomplished using known processes employed in preparing polyesters. Thus, the components of the ester-containing polyol can be reacted together in a single stage, i.e., all the reactants are added to the reactor at the same time, or in several stages wherein the polyol and a portion of the acid are first reacted to form a partial ester following which the remainder of the acid is reacted with the partial ester to form the finished ester. The equivalent ratio of total acid reactant to total alcohol reactant ranges from about 1:19 to about 1:1.2, preferably from about 1:10 to about 1:1.5.

The amine-aldehyde resins in the compositions of the invention are condensation products of an aldehyde with melamine, urea, benzoguanamine, or a similar compound. They can be water-soluble or they can be organic solvent-soluble. Generally, the aldehyde employed is formaldehyde, although useful products can be made from other aldehydes, such as acetaldehyde, crotonaldehyde, acrolein, benzaldehyde, glyoxal and furfural. Condensation products of melamine, urea and benzoguanamine are the most common and are preferred, but products of other amines and amides in which at least one amino group is present can also be employed. For example, such condensation products can be produced from triazines, diazines, triazoles, guanidines, guanamines, and alkyl- and aryl-substituted derivatives of such compounds, including alkyl-substituted, aryl-substituted and cyclic ureas, and alkyl- and aryl-substituted melamines. Some examples of such compounds are N,N-dimethylurea, benzylurea, N,N'-ethyleneurea, formoguanamine, acetoguanamine, ammeline, 2-chloro-4,6-diamino-1,3,5-triazine, 3,5-diaminotriazole, 4,6-diaminopyrimidine and 2,4,6-triphenyltriamino-1,3,5-triazine.

These aldehyde condensation products contain methylol groups or similar alkylol groups, depending upon the particular aldehyde employed. Ordinarily, in producing amine-aldehyde condensation products, all or part of these methylol groups are etherified by reaction with an alcohol to produce an alkylated product.

Various alcohols can be employed for the etherification of the alkylol groups. These include essentially any monohydric alcohol, with the preferred alcohols being methanol, ethanol, propanol, butanol and other lower alkanols having up to about 5 carbon atoms. There can also be employed alcohols such as the lower alkyl monoethers of ethylene glycol, e.g., ethylene glycol monoethyl ether and ethylene glycol monobutyl ether. Higher alcohols can be used but are less desirable because they tend to affect the film properties of the baked film. When the alkylated amine-aldehyde condensate is to be utilized in a vehicle to be employed in a water-dispersed coating composition, it is preferred to employ a water-soluble alcohol in the etherification.

The amine-aldehyde condensation products are produced in a manner well-known in the art, using acidic or basic catalysts and varying conditions of time and temperature. The aldehyde is often employed as a solution in water or alcohol, and the condensation, polymerization and etherification reactions are carried out either sequentially or simultaneously.

Specific useful amine-aldehydes include a methyl ether or ethyl ether of tetramethylolbenzoguanamine, hexakis(methoxymethyl)melamine, ethoxymethoxymethylmelamine, trimethoxymethylmelamine and triethoxymethylmelamine. Mixtures of amine-aldehydes are useful.

The resin solids portion of the coating compositions herein consist essentially of (a) from about 15 parts to about 90 parts, preferably from about 45 parts to about 75 parts of the ester-containing polyol and (b) from about 10 parts to about 85 parts, preferably from about 25 parts to about 55 parts, by weight of the amine-aldehyde resin. The balance of the composition, if any, can be an organic solvent, water or a mixture thereof.

Organic solvents which are employed include the ether alcohols such as ethylene glycol monobutyl ether, ethylene glycol monoethyl ether and diethylene glycol monobutyl ether; lower alkanols such as ethanol, isopropanol and butanol; hydrocarbons such as toluene and xylene; halogenated hydrocarbons, e.g., methylene chloride; ketonic solvents such as methyl ethyl ketone and methyl isobutyl ketone; esters, e.g., ethyl acetate, butyl acetate and amyl acetate; nitrosolvents, e.g., nitropropanes; heterocyclics, e.g., dioxane, tetrahydrofuran and N-methyl pyrrolidone; and mixtures thereof. When water-solubility of the composition is insufficient and a water-dispersible composition is desired, this is readily accomplished with respect to the ester-containing polyol by incorporating sufficient acid therein for neutralization and solubilization purposes; as is well known, the acid groups of the ester are neutralized with an appropriate basic component such as an amine to provide for the water-solubility or dispersibility. As will be apparent, the neutralized ester-containing polyol is then combined with a water-soluble or dispersible amine-aldehyde resin to form the water-soluble or dispersible coating composition.

In some instances it is desirable to employ water or mixtures of organic solvents and water to reduce the composition without using a base for neutralization. For example, if it is desired to produce a coating composition having a substantial quantity of water therein, it is often advantageous to utilize a mixture of water and water-miscible or water-soluble organic solvents. In this regard, mixtures of the above-mentioned ether alcohols and water are particularly suitable.

The coating compositions herein having a low viscosity value permits the coating compositions to be used in conventional coating methods, e.g., spraying, dipping, roll coating and brushing without the need to employ substantial amounts of volatile solvents. Furthermore, the high solids content compositions which are feasible herein means that multiple coatings are not needed to achieve film build-up. The resultant coatings possess good adhesion to many substrates (as listed below), flexibility, hardness, detergent resistance, solvent resistance and durability.

Particularly valuable low organic solvent-containing coating compositions which cure at relatively low temperatures are obtained by incorporating a suitable cure accelerating catalyst into the composition. The term "relatively low temperature" as utilized in that context refers to compositions which are cured at temperatures of less than about 300° F., as opposed to about 325° F. to 450° F. for most other high solids coating compositions. The preferred cured accelerating catalysts which are employed for this purpose are para-toluenesulfonic acid and dodecylbenzenesulfonic acid. However, other catalysts such as monoalkyl ester of phosphoric acid and methanesulfonic acid can be used. When it is desired to employ a catalyst in the composition, the catalyst is present in an amount of from about 0.1 to about 5 percent, based on the total solids content of the ester-containing polyol and the amine-aldehyde resin. It is understood that when a high catalyst level and low temperature cure is needed, the catalyst is added to the composition just prior to application.

In addition to the ester-containing polyol, amine-aldehyde compounds, and if desired, solvents and cure accelerating catalysts, the coating composition of this invention can contain various other optional ingredients including various pigments and dyes of the type ordinarily utilized in coatings of this class. In addition, various fillers, plasticizers, antioxidants, flow control agent and other such formulating additives can be employed in the compositions.

Co-curing components can also be utilized, for example, polyester resins which have high viscosities such as those prepared from diols and cyclic dicarboxylic acids. Moreover, other polyols which have no ester groups, for example, trimethylolpropane or trimethylolpropane monoallyl ether can be employed. In addition, high molecular weight modifiers which may or may not contain reactive groups such as epoxy resins, polyester resins, acrylates, polyacrylates, polyvinyl butyral, polyvinyl chloride, polyurethanes and cellulose acetate butyrates are blended or admixed with the compositions herein in order to provide desired properties. Also, the low molecular weight compositions herein can be used to modify other resin systems, for example isocyanate or glycouril systems. The amount of the modifiers employed will vary depending upon the characteristics desired to be imparted to the final composition.

The baking schedules for the low organic solvent-containing coating compositions vary considerably depending upon factors such as the specific composition of the coating, and the amount and type of cure accelerating catalyst. In coating compositions which do not contain a cure accelerating catalyst, the baking temperatures range from about 200° F. to about 500° F. and time ranges from about 5 minutes to about 60 minutes. In coating compositions containing one of the preferred catalysts, baking temperatures range from about 70° F. to about 300° F. and time ranges from about 10 minutes to about 60 minutes.

Substrates to which the coating compositions are applied include metallic substrates, glass, concrete, wood and plastic.

The following examples illustrate the present invention. The molecular weights are all expressed as number average molecular weight and the viscosities at liquid state at room temperature.

EXAMPLE 1

This example illustrates the preparation of an ester-containing polyol component of the composition of the invention.

Into a 12 liter reactor equipped with a stirrer, thermometer, reflux condenser on a Dean-Stark trap, heating means and nitrogen inlet is charged 4970 grams (37.1 moles) of trimethylolpropane (TMP) and 4290 grams of benzoic acid (35.2 moles). The charged mixture is heated to about 212° F. over a period of about 1½ hours to melt the reactants. Butyl stannoic acid (14 grams) is now added. One hundred (100) milliliters of xylene is added and the mixture heated to reflux (about 345° F.), at which time water begins distilling off. Reflux is continued until a total of 600 milliliters of water has been distilled off and collected in the Dean-Stark trap, at which time a nitrogen sparge is started. Refluxing is then continued until a total of 630 milliliters of water has been distilled off. Additional xylene (50 milliliters) and TMP (50 grams) are added and held at 425° F. for about 2½ hours.

The resultant ester-containing polyol product has the following properties:

| | |
|---|---|
| Molecular weight | 233 |
| Solids content at 105° C. | 96.6 percent |
| Viscosity | 60 poises |
| OH value | 449 |
| Acid value | 1.57 |
| Gardner color | 3 |

EXAMPLE 2

A high solids coating composition is prepared by blending the following ingredients:

| Ingredients | Parts by Weight |
|---|---|
| Ester-containing polyol* | 60.0 |
| Hexakis(methoxymethyl) melamine (solids content 100%, molecular weight 390) | 40.0 |
| Para-toluenesulfonic acid (20% solution in isopropanol) | 1.5 |

*The ester-containing polyol has a number average molecular weight of 252, a hydroxyl value of 479 and a viscosity of 60–90 poises, and is formed by reacting 36.8 moles of trimethylolpropane and 35.0 moles of benzoic acid.

The resultant 100 percent solids coating composition is drawn down on a cold rolled bare steel substrate utilizing a 3 mil draw bar. The composition is then cured by baking for 30 minutes at 250° F. The resultant film is smooth, glossy and hard.

EXAMPLES 3–6

High solids coating compositions are prepared by blending the following ingredients:

| Ingredients | Parts by Weight Ex. No. 3 | 4 | 5 | 6 |
|---|---|---|---|---|
| Ester-containing polyol of Ex. 2 | 30.0 | 20.0 | 30.0 | 20.0 |
| Hexakis(methoxymethyl) melamine | 40.0 | 40.0 | 40.0 | 40.0 |
| Diol - caprolactone reaction product* | 30.0 | 20.0 | — | 20.0 |
| Para-toluenesulfonic acid | 1.5 | 1.5 | 1.5 | 1.5 |
| Tris(hydroxymethyl)aminomethane | — | 20.0 | — | — |
| Hydroxyl-containing polyester** | — | — | 30.0 | — |
| 2,2-Dimethyl-3-hydroxypropyl-2'2'-dimethyl-3'- hydroxypropionate | — | — | — | 20.0 |

*Ester-containing diol formed by reacting 1.0 mole of 2,2-dimethyl-3-hydroxypropyl-2'2'-dimethyl-3'-hydroxypropionate and 1.0 mole of epsilon-caprolactone.
**A neopentyl glycol-adipic acid polyester formed by reacting 2.1 moles of neopentyl glycol and 1.0 mole of adipic acid.

The resultant 100 percent solids coating compositions are drawn down on a cold rolled bare steel substrate and baked for 30 minutes at 250° F. as in Example 2. The resultant films are smooth, glossy and hard.

EXAMPLE 7

This example illustrates the preparation of a pigmented high solids coating composition.

In this example, a pigment paste is first prepared by blending the following ingredients:

| | |
|---|---|
| Acrylic resin grind vehicle | 12.9 grams |
| Hexakis(methoxymethyl) melamine | 6.4 grams |
| Diacetone alcohol | 3.8 grams |
| Methyl isobutyl ketone | 5.1 grams |
| Xylene | 1.0 grams |
| Titanium dioxide | 90.0 grams |

The above ingredients are ground to a reading of #7 on a Hegman grind in a Cowles mixer utilizing conventional pigment grinding techniques.

The resultant pigment paste and the following ingredients are then blended to form the high solids coating composition:

| | |
|---|---|
| Pigment paste as above | 119.2 grams |
| Ester-containing polyol of Ex. 2 | 60.0 grams |
| Hexakis(methoxymethyl) melamine) | 33.6 grams |
| Silicone surfactant** | 0.1 gram |
| Para-toluenesulfonic acid solution of Example 2 | 5.0 grams |

**Available from Union Carbide Corp. as L-75.

The resultant composition has the following properties:

| | |
|---|---|
| Total solids | 88.0 percent |
| Resin solids | 45.6 percent |
| Viscosity | 15.0 poises |
| Pigment to binder ratio | 0.9/1.0 |

The composition is reduced to 80 percent total solids utilizing a 1:3 solvent mixture of butanol and xylene and spray applied to primed and unprimed steel panels. The coated steel panels are then cured for 20 minutes at 200° F. and 250° F., respectively. The resultant films are tested for various properties. Test results are as follows:

| Type Test | Panel Cured 20 Minutes at 200° F. | Panel Cured 20 Minutes at 250° F. |
| --- | --- | --- |
| Acetone Resistance | 100 double rubs | 100 double rubs |
| Pencil Hardness | 3H | 6H |
| 60° Gloss | 96 | 97 |
| Impact Resistance (in.-lbs.) | | |
| Forward | 30 in.-lbs. | 30 in.-lbs. |
| Reverse | <10 in.-lbs. | <20 in.-lbs. |
| Conical Mandrel | cracking entire length | cracking entire length |
| Stain Resistance | excellent | excellent |
| Detergent Resistance (ASTM D-2248) | | |
| Unprimed panel | 48 hours | 48 hours |
| Primed panel | 248 hours | 240 hours |
| Humidity Resistance (ASTM D-2247) | | |
| Unprimed panel | 168 hours | 264 hours |
| Primed panel | 528 hours | OK at 600 hours |
| Salt Spray Resistance (ASTM B-117) | | |
| Unprimed panel | 432 hours | OK at 600 hours |
| Primed panel | OK at 600 hours | OK at 600 hours |
| Cross Hatch Adhesion | Pass | Pass |

EXAMPLE 8

This example illustrates the preparation of a pigmented high solids coating composition in which the ester-containing polyol is a TMP-dibenzoate.

In this example, a pigment paste is first prepared by blending and grinding the following ingredients utilizing the procedure of Example 7:

| | |
| --- | --- |
| Acrylic grind resin vehicle | 100.0 grams |
| Diacetone alcohol | 30.0 grams |
| Methyl isobutyl ketone | 50.0 grams |
| MPA (Thixotropic agent available | 7.5 grams |
| Titanium dixoide | 700.0 grams |
| Hexakis(methoxymethyl) melamine | 50.0 grams |

A high solids coating composition is then prepared by blending a portion of the above pigment paste and the following ingredients:

| | |
| --- | --- |
| Pigment paste (as above) | 120.0 grams |
| Ester-containing polyol* | 65.0 grams |
| Hexakis(methoxymethyl) melamine | 35.0 grams |
| Silicone surfactant of Example 7 | 0.1 gram |
| Para-toluenesulfonic acid of Example 7 | 5.0 grams |

*The ester-containing polyol has a number average molecular weight of 418, a hydroxyl value of 134 and a viscosity of 300 poises and is formed by reacting 1.0 moles of trimethylol propane and 2.0 moles of benzoic acid.

The resultant composition has a total solids content of 90.4 percent and a resins solids content of 47.2 percent.

The high solids coating composition is applied to a bare steel substrate as in Example 7 and cured for 20 minutes at 250° F. The cured film is then evaluated for acetone resistance and hardness. The film passes 80 double acetone rubs and has a pencil hardness of H.

EXAMPLE 9

A high solids coating composition is prepared by blending the following ingredients:

| | |
| --- | --- |
| Pigment paste of Example 8 | 119.2 grams |
| Ester-containing polyol* | 60.0 grams |
| Hexakis(methoxymethyl) melamine | 33.6 grams |
| Silicone surfactant of Example 7 | 0.1 gram |
| Para-toluenesulfonic acid | 5.0 grams |

*The ester-containing polyol has a number average molecular weight of 572, a hydroxyl value of 588 and a viscosity of 150 poises, and is formed by reacting 2.67 moles of trimethylol propane, 1.0 moles of benzoic acid and 0.5 moles of adipic acid.

The resultant coating composition has a total solids content of 90.6 percent and resins solids content of 45.3 percent. The composition is applied to a steel panel, baked and tested for acetone resistance and hardness following the procedure of Example 8. The resultant film has an acetone resistance of 100+ acetone double rubs and a pencil hardness of 6H.

EXAMPLE 10

A high solids coating composition is prepared by blending the following ingredients:

| | |
| --- | --- |
| Pigment paste of Example 8 | 119.2 grams |
| Ester-Containing polyol* | 60.0 grams |
| Hexakis(methoxymethyl) melamine) | 33.6 grams |
| Silicone surfactant of Example 7 | 0.1 gram |
| Dodecylbenenze sulfonic acid (20% solution in n-butanol) | 5.0 grams |

*The ester-containing polyol has a number average molecular weight of 688, a hydroxyl value of 489 and a viscosity of 300 poises, and is formed by reacting 3.0 moles of trimethylol propane, 2.0 moles of benozic acid and 0.5 moles of adipic acid.

The resultant coating composition has a total solids content of 90.6 percent and a resin solids content of 45.3 percent. The composition is applied to a steel panel, baked and tested for acetone resistance and hardness as in Examples 8-9.

The resultant film has an acetone resistance of 100 acetone double rubs and a pencil hardness of 4 H.

EXAMPLE 11

A high solids coating composition is prepared by blending the following ingredients:

| | |
| --- | --- |
| Pigment paste of Example 8 | 120.8 grams |
| Ester-containing polyol* | 65.0 grams |
| Hexakis(methoxymethyl) melamine | 37.0 grams |
| Silicone surfactant of Example 7 | 0.1 gram |
| Para-toluene sulfonic acid | 5.5 grams |
| Methyl isobutly ketone | 5.0 grams |

| | |
|---|---|
| Xylene | 5.0 grams |

*The ester-containing polyol has a number average molecular weight of 371, a hydroxyl value of 302 and a viscosity of 1000 poises, and is formed by reacting 1 mole of pentaerythritol and 2 moles of benzoic acid.

The resultant coating composition has a total solids content of 86.9 percent and a resin solids content of 49.8 percent. The composition is applied to a steel panel, baked and tested as in Example 8.

The resultant film has an acetone resistance of 100+ acetone double rubs and a pencil hardness of 3 H.

What is claimed is:

1. A coating composition having an organic solvent content of less than about 30 percent, said composition consisting essentially of:
    a. an at least 40 percent resins solids content of:
        (i) from about 15 parts to about 90 parts of an ester-containing polyol having a number average molecular weight of from about 160 to about 500, a hydroxyl value of from about 180 to about 800 and a viscosity of less than about 600 poises, said ester-containing polyol being the esterification product of (1) an acid reactant comprising from about 55 molar percent to about 100 molar percent of an aromatic or alicyclic monobasic acid, and from about 0 molar percent to about 45 molar percent of an aromatic, alicyclic or aliphatic dicarboxylic acid or their anhydrides where they exist, or mixture thereof, and (2) an alcohol reactant comprising a polyol having a hydroxyl functionality of from about 2.1 to about 5.0 wherein the equivalent ratio of the acid reactant to the alcohol reactant is from about 1:19 to about 1:1.2; and
        (ii) from about 10 parts to about 85 parts of an amine-aldehyde resin; and
    b. the balance, if any, water.

2. The coating composition of claim 1 wherein the monobasic acid comprises from about 65 molar percent to about 100 molar percent of the acid reactant and the dicarboxylic acid comprises from about 0 molar percent to about 35 molar percent of the acid reactant.

3. The coating composition of claim 2 wherein the monobasic acid reactant is an aromatic monobasic acid.

4. The coating composition of claim 2 wherein the equivalent ratio of acid reactant to polyol utilized in forming the ester-containing polyol is from about 1:10 to about 1:1.5.

5. The coating composition of claim 4 wherein the dicarboxylic acid is selected from the group consisting of adipic acid, azelaic acid and mixtures thereof.

6. The coating composition of claim 4 wherein the resin solids portion consists essentially of:
    (i) from about 45 parts to about 75 parts of the ester-containing polyol; and
    (ii) from about 25 parts to about 55 parts of the amine-aldehyde resin.

7. The coating composition of claim 6 wherein the polyol has a hydroxyl functionality of from about 2.5 to about 4.0.

8. The coating composition of claim 4 wherein the solids content is at least about 70 percent.

9. The coating composition of claim 8 wherein the mono-basic acid is benzoic acid and the polyol is trimethylolpropane or polycaprolactone triol.

10. The coating composition of claim 9 wherein the ester-containing polyol is the esterification product of trimethylolpropane, benzoic acid and adipic or azelaic acid.

11. The coating composition of claims 1, 8 or 10 wherein the amine-aldehyde resin is an aldehyde condensation product of melamine, urea or benzoguanamine.

12. The coating composition of claim 11 wherein the amine-aldehyde resin is hexakis(methoxymethyl)melamine.

13. A coating composition having an organic solvent content of less than about 30 percent, said composition consisting essentially of
    a. an at least 40 percent resin solids content of:
        (i) from about 15 parts to about 90 parts of trimethylolpropane monobenzoate or trimethylolpropane dibenzoate, each having a number average molecular weight of from about 160 to about 500, a hydroxyl value of from about 180 to about 800 and viscosity of less than about 600 poises; and
        (ii) from about 10 parts to about 85 parts of hexakis(methoxymethyl)melamine; and
    b. the balance, if any, water.

* * * * *